United States Patent
Bowen et al.

(10) Patent No.: US 9,729,611 B2
(45) Date of Patent: Aug. 8, 2017

(54) METHOD AND SYSTEM FOR ABR RECORDING

(71) Applicant: Cisco Technology, Inc., San Jose, CA (US)

(72) Inventors: Gareth John Bowen, Chandlers Ford (GB); Shabtai Atlow, Efrat (IL)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 14/523,898

(22) Filed: Oct. 26, 2014

(65) Prior Publication Data

US 2016/0119404 A1    Apr. 28, 2016

(51) Int. Cl.
| | |
|---|---|
| *G06F 15/16* | (2006.01) |
| *H04L 29/08* | (2006.01) |
| *H04L 29/06* | (2006.01) |
| *H04N 5/76* | (2006.01) |
| *G06Q 10/06* | (2012.01) |

(52) U.S. Cl.
CPC ......... *H04L 67/06* (2013.01); *G06Q 10/0631* (2013.01); *H04L 65/60* (2013.01); *H04N 5/76* (2013.01)

(58) Field of Classification Search
CPC ........... H04L 67/06; H04L 65/60; H04N 5/76; G06Q 10/0631
See application file for complete search history.

(56) References Cited

U.S. PATENT DOCUMENTS

| | | | |
|---|---|---|---|
| 7,389,240 | B2 | 6/2008 | Nygren et al. |
| 7,707,273 | B2 | 4/2010 | Jones |
| 7,876,763 | B2 | 1/2011 | Cohen et al. |
| 8,046,453 | B2 | 10/2011 | Olaiya |

(Continued)

FOREIGN PATENT DOCUMENTS

WO    WO 2013/006839    1/2013

OTHER PUBLICATIONS

International Search Report and Written Opinion, dated Dec. 1, 2015.

*Primary Examiner* — June Sison
*Assistant Examiner* — Steven Nguyen
(74) *Attorney, Agent, or Firm* — Samuel M. Katz (57) ABSTRACT

In one embodiment a method, system and apparatus for adaptive bitrate (ABR) recording management is described, the method, system and apparatus comprising receiving a request to record a content item using adaptive bitrate (ABR) technology at an ABR request controller comprised in a client device, scheduling a download of the ABR content item by a recording planner, the scheduling based, at least in part, on a provided deadline by which the ABR content item is to have been completely downloaded, determining a recording plan by the recording planner in order to schedule acquisition of the ABR content item, the recording plan based, at least in part, on the provided deadline, availability of the ABR content item in ABR playlists, availability of system resources which may be used by concurrent playback and recording sessions at the client device, and bandwidth available to the client device, acquiring the ABR content item, and storing the acquired ABR content item on a storage device. Related methods, systems and apparatus are also described.

16 Claims, 8 Drawing Sheets

(56) References Cited

U.S. PATENT DOCUMENTS

| | | |
|---|---|---|
| 8,260,881 B1 | 9/2012 | Paleja et al. |
| 2009/0094248 A1 | 4/2009 | Petersen |
| 2010/0058405 A1 | 3/2010 | Ramakrishnan et al. |
| 2012/0254456 A1* | 10/2012 | Visharam ........... H04N 21/2343 709/231 |
| 2012/0311094 A1 | 12/2012 | Biderman et al. |
| 2014/0237522 A1* | 8/2014 | Rothschild ........... H04N 21/236 725/88 |
| 2015/0156086 A1* | 6/2015 | Chesla .................... H04L 43/04 709/224 |

\* cited by examiner

METHOD AND SYSTEM FOR ABR RECORDING

TECHNICAL FIELD

The present disclosure generally relates to management of scheduling of recordings of adaptive bitrate (ABR) media and content.

BACKGROUND

Items (hereinafter referred to as "content") may be downloaded and recorded on a client device where the content was acquired using ABR streaming. An ABR download system detects a user device's bandwidth and CPU capacity in real time and adjusts the quality of a video stream accordingly. The ABR download system typically includes an encoder which can encode a single source video at multiple bit rates. The player client switches between streaming the different encodings depending on available resources. As a consequence of the way the ABR download system works, the client device requires very little buffering, fast start time and a good user experience for both high-end and low-end connections.

Typically, recording an ABR session involves running a regular ABR live streaming session (i.e. recording what is available on the network at a given time under the network conditions prevalent at that time) and storing the result of that session.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method, system and apparatus for adaptive bitrate (ABR) recording management is described, the method, system and apparatus comprising receiving a request to record a content item using adaptive bitrate (ABR) technology at an ABR request controller comprised in a client device, scheduling a download of the ABR content item by a recording planner, the scheduling based, at least in part, on a provided deadline by which the ABR content item is to have been completely downloaded, determining a recording plan by the recording planner in order to schedule acquisition of the ABR content item, the recording plan based, at least in part, on the provided deadline, availability of the ABR content item in ABR playlists, availability of system resources which may be used by concurrent playback and recording sessions at the client device, and bandwidth available to the client device, acquiring the ABR content item, and storing the acquired ABR content item on a storage device. Related methods, systems and apparatus are also described.

Exemplary Embodiment

Figure 1:
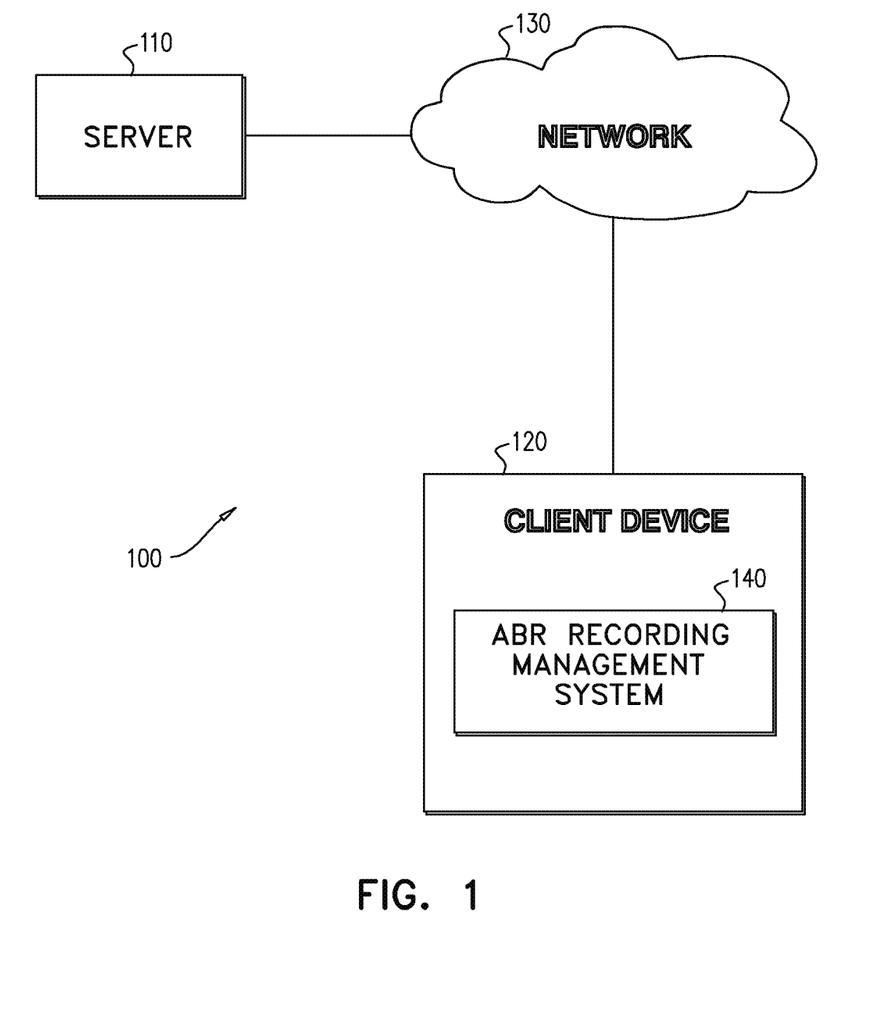
FIG. 1 is a simplified block diagram of a client device comprising a system for adaptive bitrate (ABR) recording management, the system for ABR recording management constructed and operative in accordance with an embodiment of the present invention.

Reference is now made to FIG. 1, which is a simplified block diagram of a client device 120 comprising a system for adaptive bitrate (ABR) recording management 140, the system for ABR recording management 140 constructed and operative in accordance with an embodiment of the present invention. A server 110, which might be a server in a content distribution network (CDN), provides content for ABR download to end-users. It is also appreciated that the present invention may be implemented in other situations where content is available for adaptive bitrate (ABR) downloading and streaming. The CDN is mentioned herein as one example of such an embodiment. Other non-limiting examples of such embodiments might include: a video headend where video processing and delivery occurs centrally, rather than being distributed to the edge of a CDN; a system for multicast distribution over a variety of transports including cellular access networks; and an in-home network, where content might be distributed over WiFi.

The CDN typically comprises at least one origin server (not depicted) on which large numbers of content items may be stored in order to be served to end-users, upon demand. Typically, intermediate caching servers, such as server 110, located close to end-users in the network are in communication with the above-mentioned origin server (not depicted), or other intermediate caching servers and are referred to as "edge node" servers 110, edge nodes, or edge servers. The edge node server 110 communicates with end-user client device 120, typically over a network 130. It is appreciated, however, that any appropriate server may comprise the server 110 in the system 100 of FIG. 1.

The client device 120 comprises the ABR recording management system 140. The ABR recording management system 140, as will be discussed below, has, at least, the following functions:

managing scheduling of recording of ABR content on the client device 120;

ensuring that an appropriate available bit rate is the bit rate used to download a desired content item to the client device 120; and notifying a user of the client device 120 in the event of clashes (the term "clash" will be explained further below) resulting from downloading multiple items, or in the event of a single item which may not be completely acquired in a timely fashion.

It is appreciated that in the above discussion, and throughout the present specification and claims, terms "best available bit rate", "highest quality", and so forth, are understood to mean "best available bit rate content appropriate to the particular client device in question", and "highest quality content appropriate to the particular client device in question". By way of example, there may be no reason to download high definition (HD) content to a device which only supports standard definition (SD) content. Such HD content may not be appropriate to the SD device in question.

Typical implementations of the client device 120 include, but are not limited to a tablet device, a smartphone, a desktop or a portable computer, a set-top box, an Internet-enabled television, a media center PC, or any other suitable device, such as is known in the art.

Figure 2:
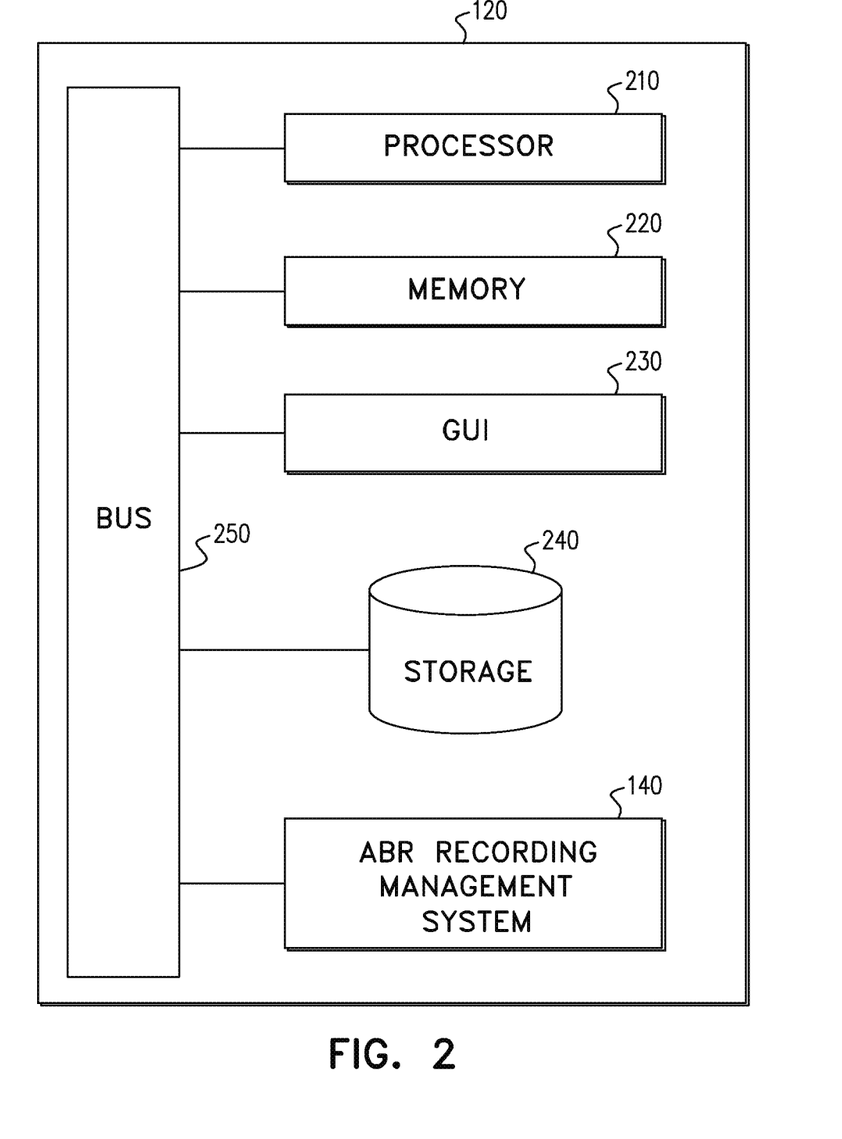
FIG. 2 is a simplified block diagram of an exemplary implementation of the client device comprising the ABR recording management system of FIG. 1.

Reference is now made to FIG. 2, which is a simplified block diagram of an exemplary implementation of the client device 120 comprising the ABR recording management system 140 of FIG. 1. The client device 120 comprises at least one processor 210, and may comprise more than one processor 210. One or more of the processors 210 may be a special purpose processor operative to perform the method for managing ABR recording as described herein. In addition, the client device 120 comprises non-transitory computer-readable storage media (i.e. memory) 220. The memory 220 may store instructions, which at least one of the processors 210 may execute, in order to perform the method for managing ABR recording as described herein.

The client device 120 comprises a user interface (typically a graphical user interface, GUI) 230. The GUI 230 may comprise an ABR playback engine (not depicted), on which the downloaded ABR content is rendered palpable to an end-user. Alternatively, the ABR playback engine may be a separate application which interacts with the GUI 230, or the ABR playback engine may be comprised in a different application, such as, but not limited to, a Web browser. The GUI 230 enables a user of the client device 120 to interact with the ABR recording management system 140.

Additionally, the client device 120 comprises a long term, non-volatile, mass storage device 240. The storage device 240 is typically utilized to store (i.e. record) downloaded ABR content items. It is appreciated that the storage device 240 may comprise a local storage device, a removable storage device, or other appropriate storage, for example, and without limiting the generality of the foregoing, remote network storage.

The client device 120 also comprises a communications bus 250 or other appropriate element in order to facilitate communications between the various components described above as comprising the client device 120. It is appreciated that the term "communications bus" (or "bus" for short), as used herein, refers to all related hardware components (wire, optical fiber, etc.) and software, including communication protocols utilized for data transfer within the mobile device 120. The bus 250 may comprise both parallel and serial bit connections, and may be wired using any appropriate methodology known in the art.

The client device 120 may also comprise typical and standard hardware and software components such as are known in the art, and are not shown for ease of depiction. These typical components may include, but are not limited to: communications apparatus, such as antennae; ports; APIs; drivers; and so forth.

Figure 3:
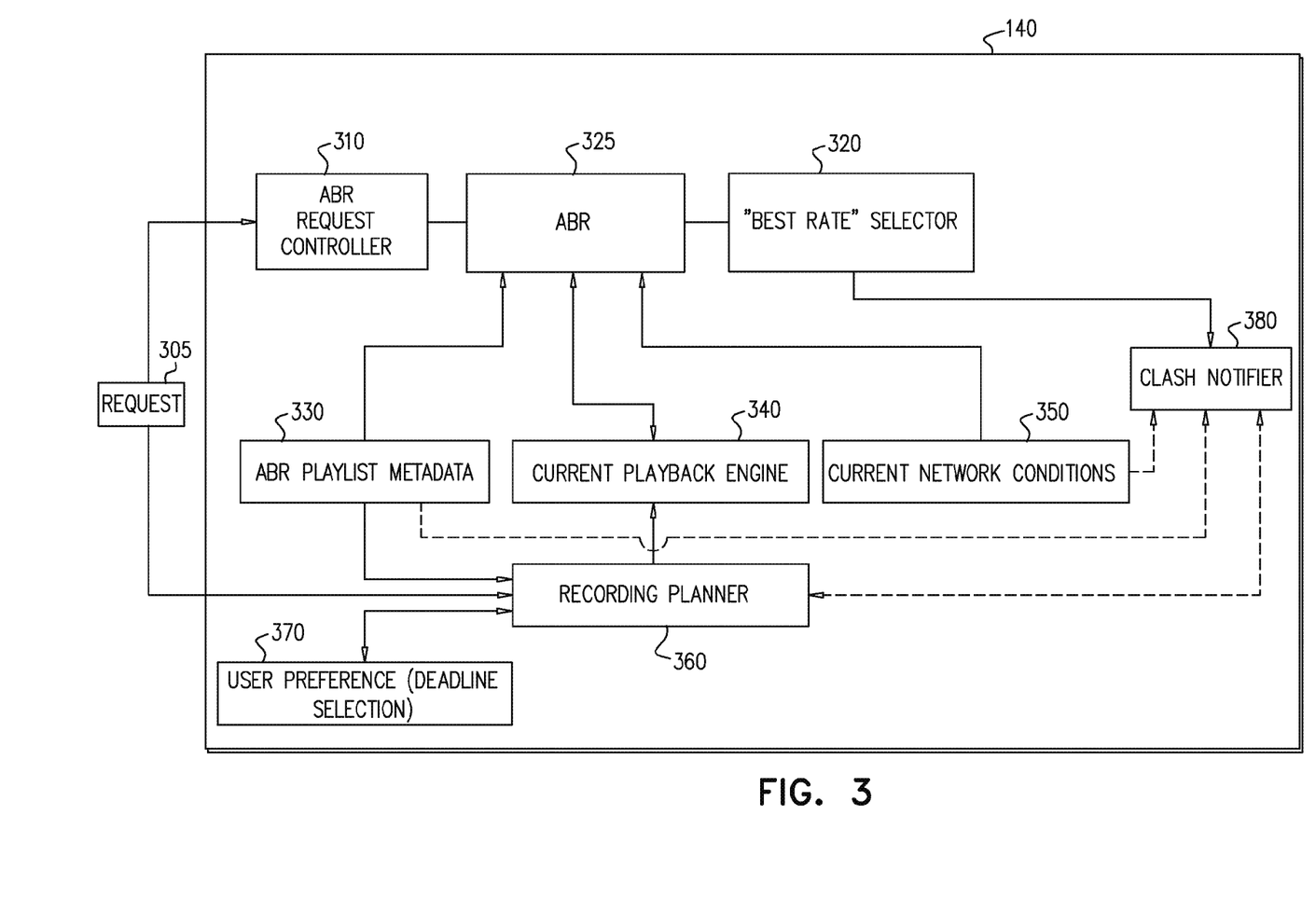
FIG. 3 is a simplified block diagram of an exemplary implementation of the ABR recording management system of FIG. 2.

Reference is now made to FIG. 3, which is a simplified block diagram of an exemplary implementation of the ABR recording management system 140 of FIG. 2. The ABR recording management system 140, as will be described below, operates within limits of live content broadcast schedules (i.e. content is only available during certain times) and real-time network conditions.

By way of introduction to ABR systems, as is known in the art, an ABR download system detects a user device's bandwidth and CPU capacity in real time and adjusts the quality of a video stream accordingly. The ABR download system typically includes an encoder which can encode a single source video at multiple bit rates. The player client switches between streaming the different encodings depending on available resources. As a consequence of the way the ABR download system works, the client device requires very little buffering, fast start time and a good user experience for both high-end and low-end connections.

ABR download typically utilizes a method of video streaming over HTTP where the source content is encoded at multiple bit rates, then each of the different bit rate streams are segmented into small multi-second parts. The streaming client is made aware of the available streams at differing bit rates, and segments of the streams, by a manifest file. When starting to download content, the client device typically requests the segments from the lowest bit rate stream. If the client finds the download speed is greater than the bit rate of the segment downloaded, then it will typically request the next higher bit rate segments. Later, if the client finds the download speed for a segment is lower than the bit rate for the segment, and therefore the network throughput has deteriorated, then it will typically request a lower bit rate segment. The segment size can vary depending on the particular implementation, but they are typically between two (2) and ten (10) seconds.

In traditional systems for recording live content items, and particularly video content items, simultaneous recording is constrained by the availability of tuners. By way of example, a device such as a personal video recorder (PVR) having two tuners is able to record two simultaneous content items. Any additional content items to be recorded will have to wait until one of the two tuners frees up. Additionally, in traditional systems, content items may only be recorded while they are being broadcast (i.e. in real-time). As a consequence of that, one of the tuners must receive each portion of the live broadcast. Should one of the tuners not receive one or more portions of the live broadcast, there would, consequently, be a gap in the resulting recording. In this PVR based system, a clash would occur if the PVR needed to simultaneously download and record more than the two items being downloaded by its two tuners. By way of example, if a program is broadcast live, in a traditional broadcast system from 7:00-7:30 PM, then the program may only be recorded during that window of 7:00-7:30 PM.

By contrast, in an ABR system, content items may be recorded without regard to the number of available tuners, because they are downloaded from the server 110 (FIG. 1) over the network 130 (FIG. 1). However, since the ABR content is downloaded from the server 110 (FIG. 1) over the network 130 (FIG. 1), available bandwidth constrains the system as to how many content items are recordable simultaneously. The content items to be recorded may be recorded as long as those content items are referenced in an ABR playlist. (It is appreciated that in some ABR protocols, the term "manifest" may be used synonymously with the term "playlist".) Content items may be acquired in a non-real time fashion from the server 110, for example, and without limiting the generality of the foregoing, at times of non-peak demand. Clashes in recording will occur when there is insufficient time to acquire the desired content items at the bit rate at which they are presently being downloaded.

It is additionally appreciated that client devices may typically have access to a portion of content held in network storage, which may be referred to as a buffer (and sometimes referred to as a review buffer). For live content ABR streaming, the review buffer is a fixed duration during which content will be held in the network after the content was originally made available, and is properly referred to as a "network review buffer". This extension of the content lifetime on the network gives the client additional time to acquire the content. For example, during regular streaming a content item may require half an hour to completely download, but not at the best available quality appropriate to a downloading client device. However, if the buffer is such that content is available in the buffer for four hours then it is possible to download the content item up to eight times slower than would be done in order to completely download the content item in half an hour when subject to real time streaming conditions. Accordingly, the recording may then be completed at a higher quality, but over a longer time. Thus, if a deadline by which the user wishes to consume the downloaded content is entered into the ABR recording management system 140, then the size of the network review buffer may be used in order to determine the quality of the content item to be downloaded. This property of "buffer depth" allows the quality of the content to be downloaded to be decoupled from its real delivery timing.

In an embodiment, the properties of ABR recording mentioned above are leveraged and combined with user's viewing intentions. In one implementation, at the time of requesting a recording, the user may enter a deadline by which time the ABR content item is to have been completely downloaded. That deadline may have been provided by the user, either at the time of making the request or as part of a user entered profile. Alternatively, the deadline might be determined heuristically by the ABR recording management system 140 or by another system within the client device 120. An exemplary implementation of the system which performs the heuristically determination would be a database of user-viewing sessions, upon which a pattern-matching method is performed. In one embodiment, the heuristically determined deadline might be provided based on a client device 120 built user-profile which is indicative of the times when the user typically consumes (i.e. views) the recorded content item. For example, if the profiled user records a daily 7:00 PM local news broadcast on a daily basis and begins watching the recording at 9:00 PM every weeknight, then the user profile would be used to heuristically determine that a deadline for recording the daily local news broadcast would be 9:00 PM (or a small amount of time before 9:00 PM, for instance, by 8:59:23 PM).

Furthermore, when the content item is a part of a series designated for series linked recording, the provided deadline may be heuristically provided on the basis of the client device building a user profile indicative of times when a user typically consumed previously recorded content items from the series.

Additionally, as noted above, the ABR recording management system 140 needs to finish recording the requested content item while the content item is still available in at least one ABR playlist accessible by the ABR recording management system 140.

A user request 305 to download a content item is received at an ABR Request Controller 310 comprised in the ABR recording management system 140. The user request 305 typically comprises one of a user input in real time; a series linked input, entered when requesting the entire linked series; or another appropriate method for the user to input the user request 305. A best rate selector 320 chooses a highest available quality version (i.e. the highest bit rate) of the requested content item in view of presently available bandwidth and a maximum download capacity of the client device 120.

An ABR streaming unit 325 downloading of the requested content item is affected, at least in part, by ABR playlist metadata 330 associated with the requested content item in the at least one ABR playlist. The ABR playlist metadata 330 includes, at least, a resource locator, such as a URI, indicating a source location from which the requested content item at the desired bit rate may be downloaded. The ABR playlist metadata 330 may also typically indicate until when the requested content item will be available in an ABR playlist, and therefore define a latest date and time for the deadline. Alternatively, the ABR playlist metadata 330 has enough information that the latest date and time for the deadline may be derived from the playlist.

The ABR streaming unit 325 will use any appropriate ABR methods available, as are known in the art.

Current conditions of the ABR playback engine 340 currently in use further affects the ABR streaming unit 325. For instance, if the ABR playback engine 340 is currently playing out content in real-time, then the ABR playback engine 340 may be constrained from applying bandwidth and resources to performing a recording. Similarly, if the ABR streaming unit 325 is currently engaged in recording a content item, then the ABR playback engine 340 may be constrained from applying bandwidth and resources to performing a second recording. Accordingly, the buffer depth enables spreading the operation of downloading over time when the ABR playback engine 340 is not otherwise constrained. Other uses of the ABR playback engine 340 may also have an effect on the availability of the ABR playback engine 340 to record the requested content item.

In addition, current real-time network conditions 350 may also affect the ABR streaming unit 325. For example, if the network 130 (FIG. 1) is currently congested, then transmitted packets transporting the requested content item may be delayed in arriving at the ABR streaming unit 325. Accordingly, the ABR streaming unit 325 will select a bitrate enabling downloading of the requested content item so that, in view of the current real-time network conditions 350, the requested content item completes downloading prior to the deadline. Thus, the selected version of the content to be downloaded is determined on the basis of its bitrate which may be downloaded in view of current network conditions.

The ABR playlist metadata 330 and the current ABR playback engine 340 also provide input to a recording planner 360. The recording planner 360, in view of received inputs, builds a recording plan (described in detail below) to record the requested content item based, at least in part, on:
  the deadline, as discussed above. A deadline interface 370 provides the recording planner with the required deadline information;
  the availability of requested content item in ABR playlists, as discussed above;
  bandwidth available for the download, as discussed above; and
  availability of system resources which may be used by concurrent playback sessions, including downloading and recording other content items, as well as possible real-time play out, and consume system resources which would otherwise be available for completing the requested download.

It is also appreciated that the amount of storage available on the mass storage device 240 (FIG. 2) for storing downloaded content might also have an effect on the recording plan which is built. Even in a theoretical case where near unlimited bandwidth and unlimited time are available for downloading the requested content item, if there is only a limited amount of storage space available on the mass storage device 240 (FIG. 2), then it does not make sense to download a higher quality version of the content item which will exceed that limited amount of storage space. Rather, a lower quality version of the content will typically be downloaded.

When one of these four factors changes, the recording planner 360 alerts a clash notifier 380 that a clash has occurred. In some cases, the clash notifier does not need to take any action. For example, and without limiting the generality of the foregoing, if there is a drop in bandwidth available on the network 130 for downloading, and the news program, mentioned above, was scheduled to complete downloading by 7:43 PM, and now, due to the drop in bandwidth available for downloading, the news program will only complete downloading by 7:59 PM, the clash need not take any action, because, as was mentioned above, the deadline by which the news program needs to have completed downloading is slightly before 9:00 PM.

However, if the drop in bandwidth available for downloading will cause the news program to only be completely downloaded by 9:07 PM, then the clash notifier 380 will need to prompt for information regarding which of the above mentioned factors may be modified. By way of example, downloading a lower quality version video of the news program may enable complete downloading of the news program slightly before 9:00 PM deadline.

In practice, any of the following may be changed in response to the prompt of the clash notifier 380 based on an input:

The recording may be rescheduled, so that a different playout time is chosen. For example, the user may respond to the prompt that he or she would be willing to watch the news program at 8:00 AM the following morning. In such a case, more bandwidth may be available to download a high quality recording of the news program after midnight, when bandwidth requirements on networks typically are at a low.

Alternatively, the user may respond to the prompt that a lower quality version of the recording may be downloaded. By way of example, a drop in video quality from 3.5 Mbit/s to 2 Mbit/s may be acceptable to the user for the news program. On the other hand, a recording of a sports event or other content item which has a large amount of action might be unacceptable to the user at a lower bit rate.

Another option is that the deadline may be extended. For example, the user may, in response to the prompt, accept that the news program will be viewed at 9:30 PM, thereby enabling the download at the desired bitrate to complete before the now extended deadline.

Finally, the recording might be cancelled. For example, the user might opt to not watch the news program if it will not be available by 9:00 PM.

It is appreciated that, in the above discussion, the user is portrayed as if actively replying in response to the prompt. In fact, the user may have set default responses to the prompt in a user profile stored on the device. For example, the user might have set in the user profile that if a clash occurs in recording the news program then the bitrate of the file to be downloaded is to be reduced (possibly not to beneath a certain minimum threshold) in order that the news program complete downloading by the slightly-before 9:00 PM deadline.

The user profile may also allow for further variety. For example the default response to the prompt in the user profile might differ for different genres of content items. For instance, the user might set a default response for news programs that a reduction of up to 33% of the highest quality bitrate may be acceptable, in order that news programs be downloaded by whatever deadline is set for them. However, the user might set the default response to the prompt for sporting events that deadlines may be extended by up to 6 hours in order that the maximum quality video be downloaded.

It is also appreciated that these user preferences may be heuristically determined by the device over time, and then implemented as defaults.

Figure 4:
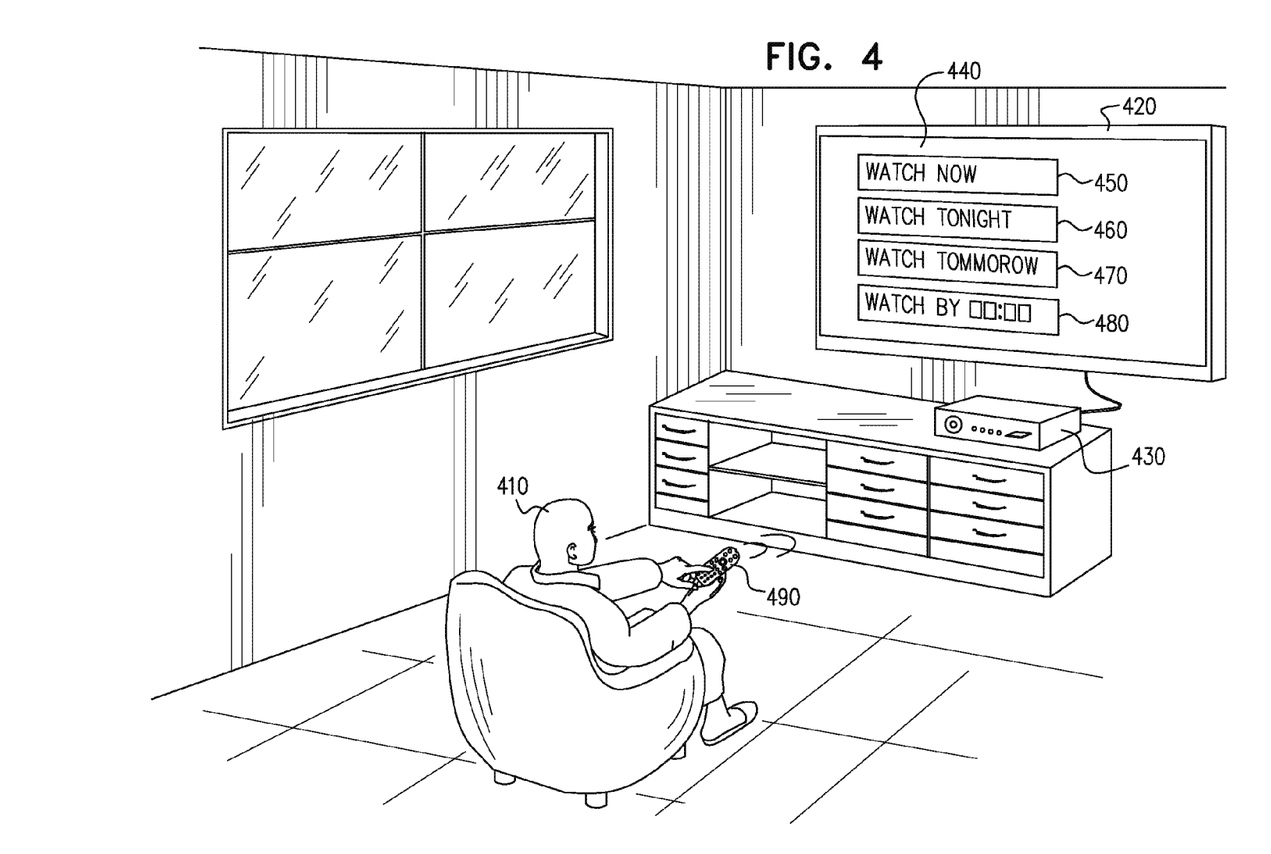
FIG. 4 is a depiction of an exemplary user interface for entering a deadline by which a recording is to be completed, for use with the ABR recording management system of FIG. 3.

It is appreciated that the device may support a user interface for both setting deadlines and for clash management. Reference is now made to FIG. 4, which is a depiction of an exemplary user interface 440 for entering a deadline by which a recording is to be completed for use with the ABR recording management system 140 of FIG. 3. In FIG. 4, a user 410 is seated before a television 420. The television is depicted as serving as a display for a video output of a set top box (STB) 430. The STB 430 serves as a gateway through which video reaches the television from the server 110 (FIG. 1) over the network 130 (FIG. 1). In this depiction, the STB 430 corresponds to the client device 120 (FIG. 1) and, as such the ABR recording management system 140 (FIG. 1) is implemented therein.

In the depiction of FIG. 4, the user 410 has selected a content item to download from the server 110 (FIG. 1), and is presented, via a menu (i.e. the user interface 440), with a number of options as to when the requested content item is to be viewed (by when must the download of the requested content item be completed). A first menu option is "Watch Now" 450. Selecting "Watch Now" 450 would result in the requested content item being streamed live for immediate consumption, and thus, whatever is acquired in real time is presented immediately and written to storage because the user has opted to both watch and simultaneously record the requested content item by selecting "Watch Now" 450.

Those of skill in the art will appreciate that when the "Watch Now" 450 (FIG. 4) option is selected for a particular download, some segments of the content item may need to be downloaded at a quality lower than the highest quality available on the network which is appropriate for viewing on the STB 430. In such a case, the ABR management recording system 140 (FIG. 3) may complete the recording at the lower quality, in order to minimize the download time, and later, when a recording plan of the recording planner 360 allows, those segments which are recorded at a lower quality may be backfilled, i.e. replaced with corresponding segments downloaded at a higher quality.

In some embodiments, individual download segments may include, in their associated metadata, indications of the quality of that individual segment. The client may have a means of determining the quality of each individual segment (e.g. through explicit indication in the associated metadata). Thus, backfill capability could be used to upgrade only the segments that need higher encoding rates to maintain a minimal quality level for the viewer, and thus may be designated for a future upgrade to a better quality. By way of example, complex video scenes may require higher encoding rates (i.e. higher bit rates) but the lower encoding rates (i.e. lower bit rates) may be acceptable for other less complex scenes. In an alternative embodiment, the recording planner 360 could initially select a lower recording rate to ensure that the complete recording was acquired in time, and then upgrade the segments that needed backfilling.

A second menu option is "Watch Tonight" 460. Selecting "Watch Tonight" 460 would result in the requested content item being downloaded so that the requested content item can be viewed during some time during the current night, e.g. after 7:00 PM.

A third menu option is "Watch Tomorrow" 470. Selecting "Watch Tomorrow" 470 would result in the requested content item being downloaded so that the requested content item can be viewed during sometime the next day, e.g. after 7:00 AM the following morning.

A fourth menu option, "Watch By _:_" 480 enables the user 410 to explicitly enter a time by which the requested content item must be downloaded and viewable on the television 420.

It is appreciated that in the above discussion, the menu options "Watch Tonight" 460 and "Watch Tomorrow" 470 are described as enabling the viewer to enter an approximate time (i.e. "tonight" and "tomorrow"). For many applications an option to enter an approximate time is sufficient. For other applications, the option to enter a precise time, such as the fourth menu option, "Watch By _:_" 480, would be required. In some embodiments, the "Watch By _:_" 480 option might prevent entering a time which is beyond the network review buffer depth. Additional options may be made available as appropriate. For example, and without limiting the generality of the foregoing, the system may provide a menu item for "Watch by 6:00 PM". Other appropriate menu options may be added in implementation of the user interface, as is known in the art.

The user 410 is depicted using a remote control 490 in order to interface with the STB 430. Depending on the client device 120 (FIG. 1) used, other mechanisms for interfacing with the client device 120 (FIG. 1), such as, but not limited to: a mouse or other pointing device; a finger on a touch screen; and so forth, as are known in the art may be used instead of or in addition to the depicted remote control 490.

Figure 5:
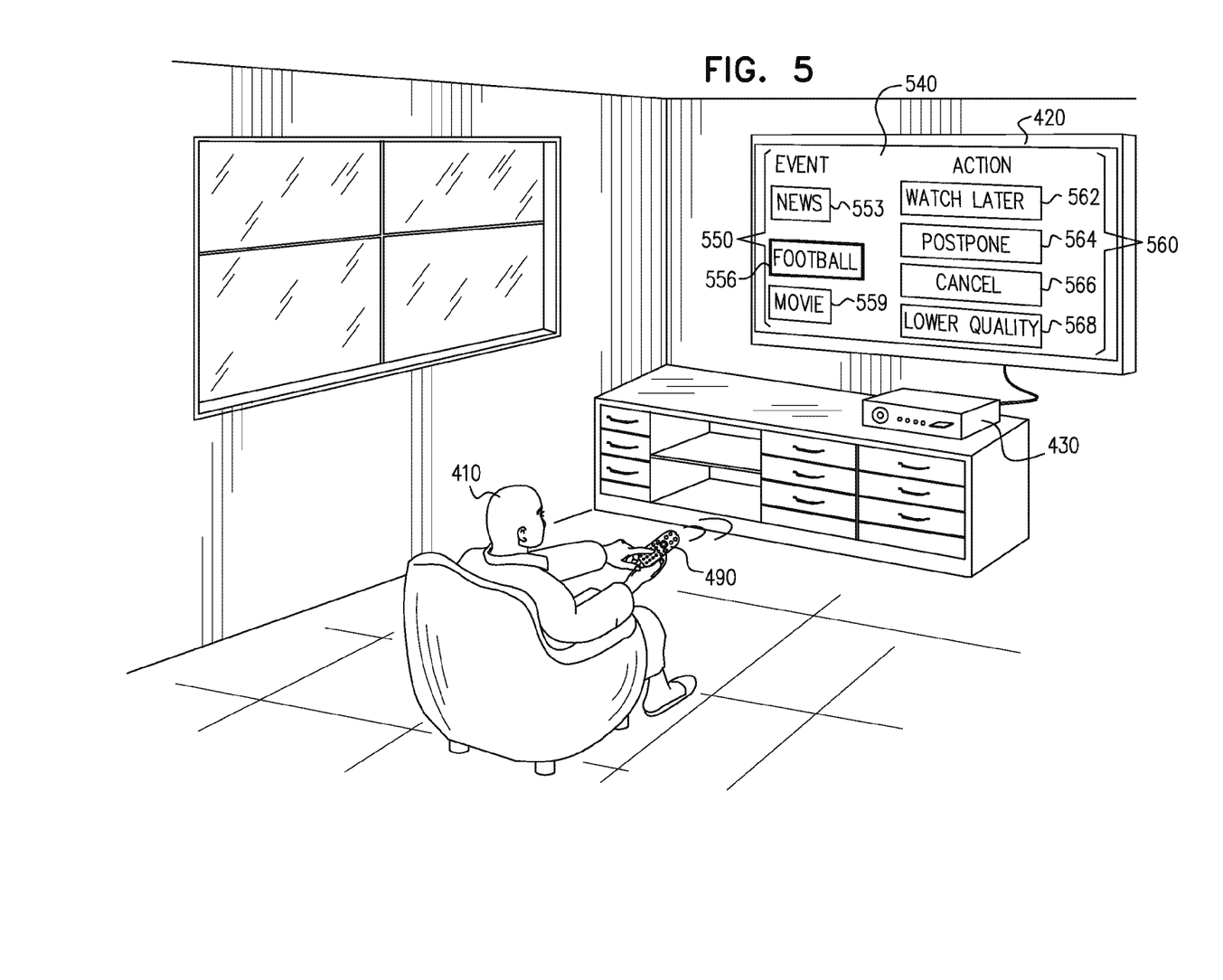
FIG. 5 is a depiction of an exemplary user interface for clash management, for use with the ABR recording management system of FIG. 3.

Reference is now made to FIG. 5, which is a depiction of an exemplary user interface 540 for clash management, for use with the ABR recording management 140 system of FIG. 3. In FIG. 5, the user 410 is presented with a menu of options (i.e. the exemplary user interface 540) for use in clash management. The user 410 is prompted to select one of the items currently pending for download from an Event menu 550. Content items displayed on the Event menu 550 are depicted here with generic titles: News 553, Football 556, and Movie 559. In an actual menu such as the Event menu 550, the content items would be identified in a manner which, ideally, is understandable to the user 410. For example, the name of the actual movie might appear instead of Movie 559. Team names might appear rather than Football 556, and so forth. In FIG. 5, the Football 556 option appears highlighted, that is to say selected.

Once the user 410 has selected one of the content items from Event menu 550, the user 410 is also prompted to select an action from an Action menu 560 which, when implemented, will enable the ABR recording management 140 system of FIG. 3 to change the download deadline or quality of the selected event from the Event menu 550, as discussed above. The Action menu 560 includes options for Watch Later 562, Postpone 564, Cancel 566, and Lower Quality 568. These menu items might open up submenus (not depicted) or other interface mechanisms, such as a dialog box, in order to get further information from the user 410. For example, and without limiting the generality of the foregoing, selecting Watch Later 562 might open a new submenu from which a new deadline by which the user 410 wishes to watch the content item may be entered.

Similarly, the Postpone 564 menu option may open a submenu or dialog box allowing the user 410 to select a different instance of the same event in the broadcast schedule (and to subsequently enter the deadline for the newly selected instance).

In some embodiments, after the user enters a choice of a parameter to change using the exemplary user interface 540, a confirmatory message may appear. For example, if the user has opted to lower the download quality, then a message to the effect of: "YOU HAVE CHOSEN TO LOWER THE DOWNLOAD QUALITY" may appear on the screen of the television 420 (the message is not depicted here). The user may be asked to confirm that choice, for example by clicking a YES button (not depicted), or to opt to change that choice, by clicking a CANCEL button (not depicted).

In an additional embodiment, in the event of a recording clash, the user interface 540 may present an additional option, where the user is offered an opportunity to purchase additional bandwidth which may be used for downloading the requested content item. The newly available additional bandwidth will then be used in order to complete the recording by the desired deadline.

Figure 6A:
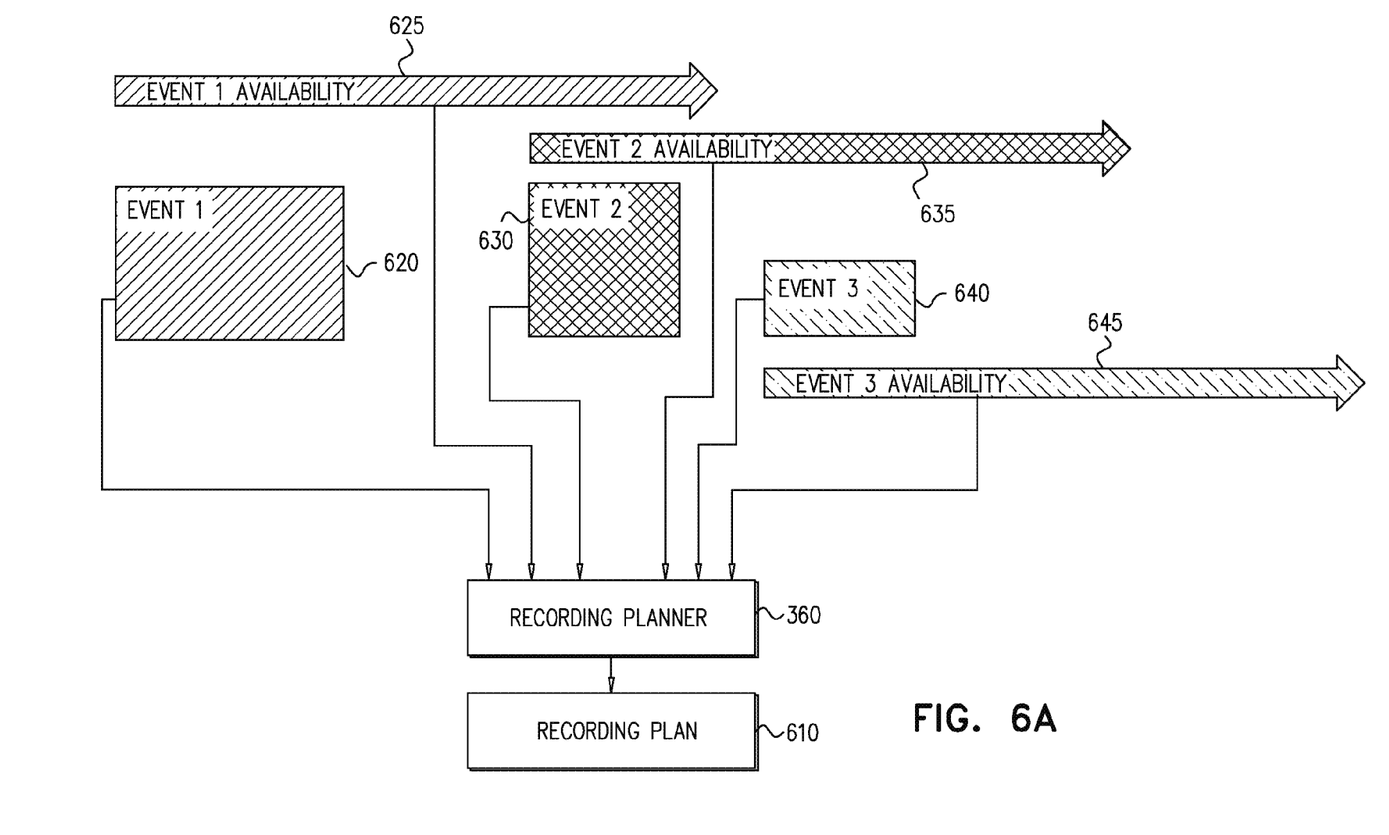
FIG. 6A is a depiction of an building an exemplary recording plan by the recording planner of the ABR recording management system of FIG. 3.

Reference is now made to FIG. 6A, which is a depiction of building an exemplary recording plan by the recording planner of the ABR recording management system of FIG. 3. In FIG. 6A, three user inputs, "Event 1" 620, "Event 2" 630, and "Event 3" 640 are depicted. The three user inputs "Event 1" 620, "Event 2" 630, and "Event 3" 640 represent three content items selected by the user to be downloaded. As was discussed above, the availability of a content item constrains when the content item may be downloaded. Accordingly, three constraints, one each for each of "Event 1" 620, "Event 2" 630, and "Event 3" 640, are also depicted: arrow 625 for Availability of Event 1 620; arrow 635 for Availability of Event 2 630; and arrow 645 for Availability of Event 3 640. The significance of the dimensions of the rectangles and arrows depicted as "Event 1" 620, "Event 2" 630, "Event 3" 640, arrow 625 for Availability of Event 1 620; arrow 635 for Availability of Event 2 630; and arrow 645 for Availability of Event 3 640 are discussed in detail below, with reference to FIG. 6B.

These three user selections for download, "Event 1" 620, "Event 2" 630, and "Event 3" 640 as well as the three constraints arrow 625 for Availability of Event 1 620; arrow 635 for Availability of Event 2 630; and arrow 645 for Availability of Event 3 640 are all depicted flowing into the recording planner 360. The recording planner 360 takes the three user inputs of selections (enumerated above) for download and their associated constraints (enumerated above), and builds a recording plan 620. The details of the processes of building the recording plan 620 are discussed in detail below, with reference to FIG. 6B.

Figure 6B:
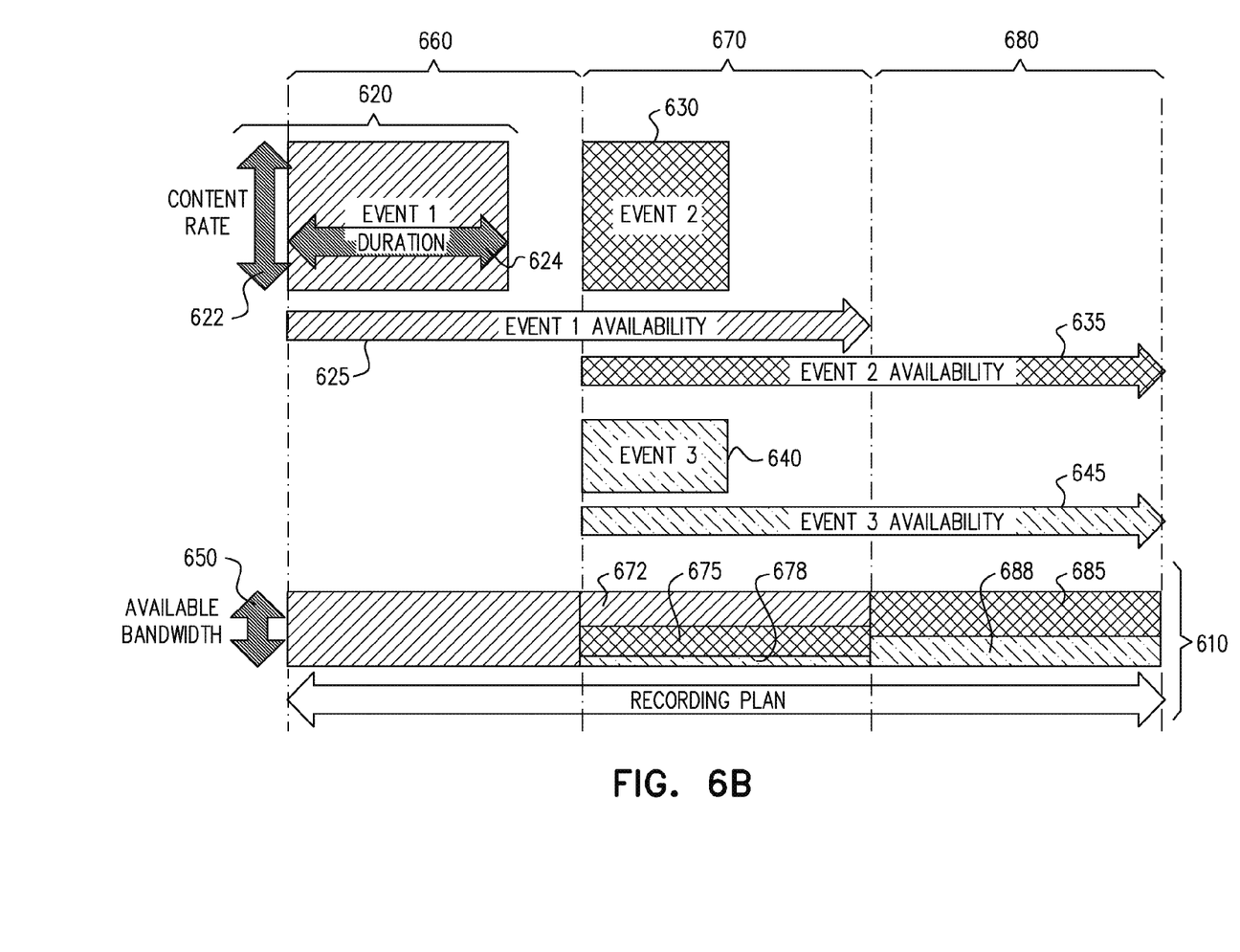
FIG. 6B is a representation of an exemplary recording plan of the recording planner of the ABR recording management system of FIG. 3.

Reference is now additionally made to FIG. 6B, which is a representation of an exemplary recording plan 610 of the recording planner 360 (FIG. 3) of the ABR recording management system 140 of FIG. 3. In the exemplary recording plan 610 three content items are to be downloaded, as discussed above. The three events are depicted as rectangles where the height of the rectangle represents the content rate 622 (or the bitrate, which is associated with the quality) of the event. The rectangle associated with an event having a greater content rate 622 relative to other events is depicted having a greater height relative to rectangles representing other events. The rectangle associated with an event with a lower content rate 622 relative to other events is depicted having a lower height relative to other rectangles representing other events.

Similarly, the depicted length of the rectangles represents a duration of the event 624 (namely, the amount of time needed to play out the event at normal speed). The rectangle associated with an event of a longer duration 624 relative to other events is depicted having a greater length relative to the rectangles representing other events. The rectangle associated with an event with a shorter duration 624 relative to other events is depicted having a shorter length relative to the rectangles representing other events. These characteristics are explicitly shown for the rectangle designated "Event 1". Thus, the area of the rectangle is indicative of the size of the file to be downloaded for the associated event.

The availability of the event in an ABR playlist is also shown as an arrow, such as arrow 625 for Event 1 620, arrow 635 for Event 2 630, and arrow 645 for Event 3 640. The length of the arrows 625, 635, and 645 represents the length of time the event is available in the playlist. Furthermore, each arrow is depicted as having the same hash pattern as its corresponding event's rectangle.

Recording plan 610 is depicted in a fashion such that each event is depicted as downloading so that all downloading events at any given time fill all of the bandwidth available 650 for downloading at that given time (indicated by the height of the rectangle representing the recording plan 610). In a first time-period 660, only Event 1 620 is available in an ABR playlist (indicated by Event 1 availability arrow 625) and only event 1 is downloading, and all of the bandwidth available for downloading 650 is dedicated to downloading Event 1 620 during this time. The recording plan 610 is, during the first period 660, only shaded with the same hashing as the rectangle representing Event 1 620 is shaded.

In a second time-period 670, Event 1 620 is still downloading, and thus remains in the recording plan 610, but now, both Event 2 630 and Event 3 640 are available in an ABR playlist (indicated, respectively, by Event 2 availability arrow 635 and by Event 3 availability arrow 645). Accordingly, and in response to a request to record both Event 2 630 and Event 3 640, the recording plan 610 is updated to include the download of both of these events. Recording plan 610 is therefore depicted in second period 670 as having a first portion 672 of the bandwidth available for downloading 650 being used to download Event 1 620. A second portion 675 of the bandwidth available for downloading 650 is being used to download Event 2 630 during the second period 670. Finally, a third portion 678 of the bandwidth available for downloading 650 is being used to download Event 3 640 during the second period 670.

At the end of the second time-period 670, Event 1 620 is now fully downloaded, and therefore, the first portion 672 of the bandwidth is no longer needed to download Event 1 620. Accordingly, the first portion 672 of the bandwidth may now be redistributed and added to the second portion 675 of the bandwidth being used to download Event 2 630 and the third portion 678 of the bandwidth being used to download Event 3 640.

Accordingly, a third time-period 680 begins. Event 1 availability arrow 625 is no longer present. The bandwidth available for downloading 650 is now redistributed so that a first portion 685 of the bandwidth available for downloading 650 is now dedicated to downloading Event 2 630, and a second portion of the bandwidth available for downloading 650 is now dedicated to downloading Event 3 640.

It is further appreciated that in some embodiments, content deemed prime content, either at the initiative of a content or service provider, or at the initiative of the user, may be pushed to the client device 120 (FIG. 1). Additionally, in hybrid systems, downloading over the network may be augmented with content pushed via satellite onto the client device 120.

Where catch-up services are available (i.e. where content items are available for amounts of time, often several days, after an original broadcast), the catch-up service may also be used downloading content items, for replacing lower quality segments of the content items, and as an alternative server to server 110 (FIG. 1) when network conditions are more favorable for relying on the catch-up service.

Figure 7:
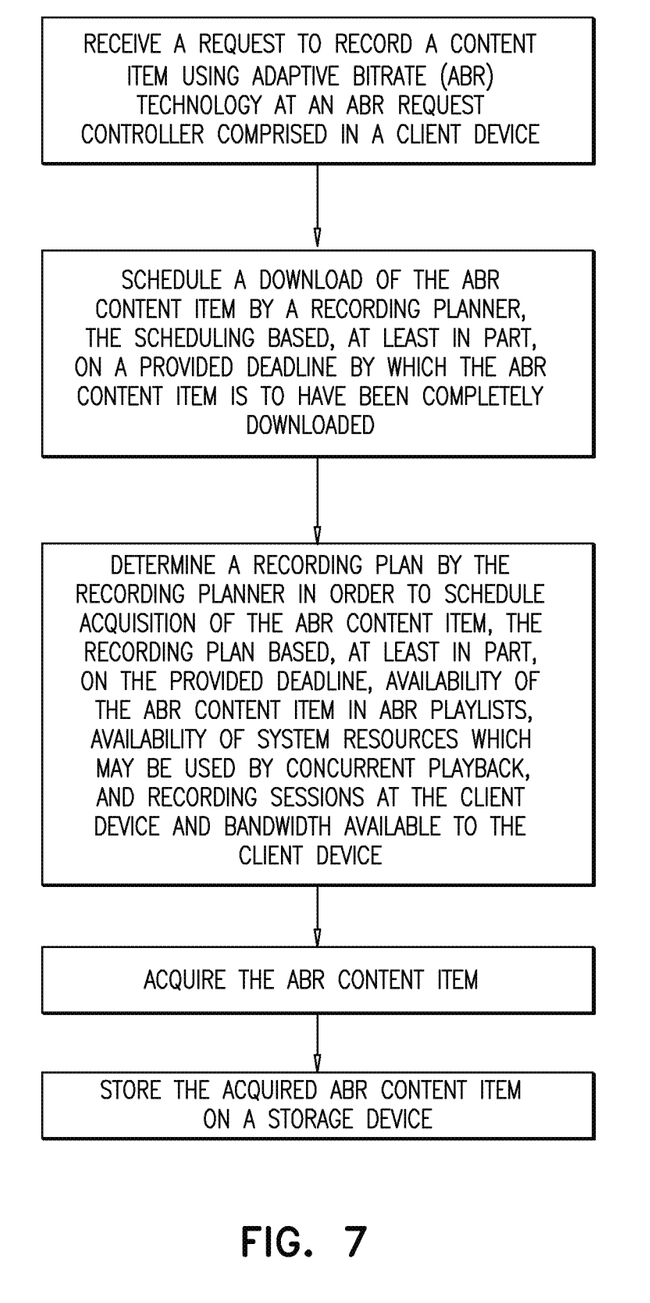
FIG. 7 is a flowchart of a method of operation of one embodiment described herein.

Reference is now made to FIG. 7, which is a simplified flow chart of one embodiment described herein. The method of FIG. 7 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   receiving a request to record a content item using adaptive bitrate (ABR) technology at an ABR request controller comprised in a client device;
   scheduling a download of the ABR content item by a recording planner, the scheduling based, at least in part, on a provided deadline by which the ABR content item is to have been completely downloaded, the provided deadline comprising
   a heuristically determined deadline based on a user profile built by the client device, the user profile being indicative of times when a user typically views recorded ABR content items;
   determining a recording plan by the recording planner in order to schedule acquisition of the ABR content item, the recording plan based, at least in part, on:
   the provided deadline;
   availability of the ABR content item in ABR playlists;
   availability of system resources which may be used by concurrent playback and recording sessions at the client device; and
   bandwidth available to the client device;
   acquiring the ABR content item; and
   storing the acquired ABR content item on a storage device.

2. The method according to claim 1 and wherein the scheduling also being based, at least in part, on selecting a highest available quality version of the requested content item appropriate for the client device.

3. The method according to claim 1 wherein the ABR content item comprises a part of a series designated for series linked recording, and the deadline is heuristically determined based on the user profile built by the client device, the user profile being indicative of times when a user typically viewed previously recorded content items from the series.

4. The method according to claim 1 wherein the recording plan is changed when one or more of the following occurs:
the provided deadline changes;
the ABR content item's availability in an ABR playlist changes;
the number of concurrent playback and recording sessions changes; and
the observed available bandwidth changes.

5. The method according to claim 4 wherein if the changed recording plan requires one of:
a change of recording quality for a recording which has already started; and
a sub-optimal recording quality for a recording which has not yet started;
then the client device prompts for allowing a change, the change comprising one of:
postponing a scheduled download time for the ABR content item;
changing a time when the ABR content item is to be available for viewing;
changing the recording quality; and
cancelling the recording.

6. The method according to claim 5 wherein a response to the client device prompt is an explicit user provided response.

7. The method according to claim 5 wherein a response to the client device prompt is provided by a user configured default response stored in a user profile.

8. The method according to claim 7 wherein the configured default response is different for different genres of content items.

9. The method according to claim 5 wherein a response to the client device prompt is provided based on a user profile built by the client device which stores a heuristically determined default response.

10. The method according to claim 5 and further comprising providing an offer to a user to provide more bandwidth to the client device.

11. The method according to claim 1 wherein the client device is a hybrid device and a portion of the ABR content item is acquired using non-ABR methods to download resources.

12. The method according to claim 1 wherein acquired portions of the ABR content item are recorded and missing portions are backfilled at a later time, when the recording plan permits downloading the missing portions.

13. The method according to claim 1 and further comprising:
determining the bitrate of each individual download segment comprising the ABR content item by the client device; and
detecting at least one of the downloaded segments which was downloaded at a lower quality than other downloaded segments.

14. The method according to claim 13 wherein the detected at least one of the downloaded segments is backfilled at a higher quality by the client device.

15. The method according to claim 1 wherein the determining the recording plan is also based on an amount of storage available on the storage device for storing downloaded content.

16. A system comprising:
a processor executing instructions in communication with
a memory storing the instructions to provide:
an ABR request controller comprised in a client device which receives a request to record a content item using adaptive bitrate (ABR) technology;
a recording planner which schedules a download of the ABR content item, the scheduling based, at least in part, on a provided deadline by which the ABR content item is to have been completely downloaded, the provided deadline comprising
a heuristically determined deadline based on a user profile built by the client device, the user profile being indicative of times when a user typically views recorded ABR content items;
the recording planner then determines a recording plan in order to schedule acquisition of the ABR content item, the recording plan based, at least in part, on:
the provided deadline;
availability of the ABR content item in ABR playlists;
availability of system resources which may be used by concurrent playback and recording sessions at the client device; and
bandwidth available to the client device;
an ABR streaming unit which acquires the ABR content item; and
the storage device for storing the acquired ABR content item.

* * * * *